3,031,413
SOLUTION OF A CARBIDE IN A MOLTEN HALIDE

William A. Barber, Springdale, Conn., and Carol L. Sloan, Yonkers, N.Y., assignors to American Cyanamid Company, New York, N.Y., a corporation of Maine
No Drawing. Filed Sept. 29, 1959, Ser. No. 843,076
6 Claims. (Cl. 252—182)

This invention relates to new and useful compositions of matter, and more particularly to compositions which are useful as reaction media. Still more particularly the invention is concerned with such compositions comprising a solution of a carbide of the class consisting of the carbides of the alkali metals and the carbides of the alkaline-earth metals, said carbide being dissolved in a particular kind of molten solvent. Specifically, this solvent consists essentially of at least one member of the class consisting of the anhydrous (substantially completely anhydrous), molten lithium halides (fluoride, chloride, bromide, iodide) and the anhydrous, molten halides (fluoride, chloride, bromide, iodide) of the alkaline-earth metals (calcium, strontium, barium). Mixtures of any two or more or all of these halides may be used, as desired or as conditions may require.

Means whereby unusual atomic configurations in solids, e.g., the carbide moiety in calcium carbide and other metallic carbides, could be carried into organic products by reactions on the solid surface or within the solid have long been desirable. Thus, it was known prior to the present invention that in, for example, $Al_4C_3$, $CaC_2$ and $Mg_2C_3$, carbon atoms existed in groups of one, two and three, respectively, and could be considered to exist as the $C^{4-}$, $C_2^{2-}$ and $C_3^{4-}$ anions. It was further known that, on treatment with water, these materials gave, respectively, methane, acetylene, and a mixture of allene and methyl acetylene, from which facts it might be reasoned that these "anions" and possibly many others might or could be carried intact from the crystal lattice to the reaction product.

It was also known prior to this invention that a surface layer of oxide is normally present on carbides of the kind used in practicing the present invention, as well as on other carbides, and that this oxide layer is often a deterrent to the chemical reactivity of the carbide with other chemical reactants.

The present invention is one solution to the problem of providing a simple and economical means whereby reactions involving certain, particular reactive solids, namely, the carbides of the alkali metals and of the alkaline-earth metals, can be carried out.

No anticipatory prior art is known. U.S. Patent 2,729,689—Blanchard et al., acknowledges as prior art that a magnesium sesquicarbide-containing melt can be produced by reacting calcium carbide with magnesium chloride in the liquid state, the magnesium chloride being in a molten eutectic mixture with sodium chloride or potassium chloride. The invention itself is concerned with the production of magnesium sesquicarbide by heating and reacting together calcium carbide and substantially anhydrous mangesium chloride in an inert atmosphere, both of the reactants being in finely divided, solid state and in intimate contact with each other. The reaction mixture is maintained at a temperature at least sufficient for the formation of magnesium sesquicarbide but below that which causes any substantial melting of the magnesium chloride and any substantial decomposition of the magnesium sesquicarbide. U.S. Patent 2,813,017 acknowledges as prior art that an alkali metal, specifically sodium, can be produced by effecting reaction between solid NaCl and solid $CaC_2$ under vacuum and at 800°–850° C. to obtain sodium in vapor form, calcium chloride and carbon. The invention itself is concerned with the production of alkali metals or magnesium by vaporizing the corresponding chloride of the metal to be produced, and passing the metallic chloride vapors through a zone containing solid calcium carbide while maintaining in said zone a pressure substantially less than atmospheric. By this technique the chloride vapors are reduced and metallic vapors are produced. These metallic vapors are then condensed to obtain the metal per se.

In practicing the present invention an alkali-metal carbide or an alkaline-earth metal carbide (hereafter for brevity sometimes designated as "carbide" or as "metallic carbide"), in lump, pellet, finely-divided or other suitable form, is brought into intimate contact with one or more anhydrous (substantially completely anhydrous) molten (fused) lithium halides, or with one or more anhydrous (substantially completely anhydrous) molten halides of the alkaline-earth metals, or with mixtures of one or more of each of the said classes of halides in any proportions, e.g., 0.1 to 99.9 mole percent of the one halide to 99.9 to 0.1 mole percent of the other.

The carbides used in practicing this invention dissolve in the aforementioned molten halides to yield homogeneous solutions as evidenced by, for example, the lowering of the melting point of the solvent halide employed, the visual homogeneity of the frozen melt, and the uniformity (within the limits of experimental error) of analytical results from different portions of the product.

At atmospheric pressure, the temperatures used in preparing the compositions of the invention can be varied from the melting point of the solvent halide (or mixture thereof with an additive or effect agent) to the point at which the mixture or solvent halide alone volatilizes. For example, the temperature at which dissolution is effected at atmospheric pressure may be as low as 350° C. (in the case of a mixture of salt and effect agent) to 2200° C., depending upon the particular carbide and salt or mixture employed. Dissolution temperatures should not be so high as to cause decomposition of the carbide or of the salt (or mixture thereof with an additive) that is used. By employing superatmospheric pressure, higher temperatures can be used. The optimum temperature employed for making the solutions depends, for example, upon the metallic halide used and the subsequent purpose for which the solution is to be employed.

The amount of carbide that dissolves per 100 parts by weight of the resulting solution varies, for example, from about 1% to about 50%, or more, of the solution. This amount depends, for instance, upon the particular carbide and solvent halide employed, the temperature at which the solution is made, and whether or not dissolution has been permitted to continue to equilibrium state.

In preparing the solution one can either first prepare the molten solvent (molten or fused halide) and then add the carbide thereto; or one can first mixe the solid carbide and solid halide, and then heat the mixture to a temperature sufficiently high to melt the halide solvent and to dissolve the carbide in the molten mass. Dissolution should be effected in an inert atmosphere, e.g., an atmosphere of argon, helium, krypton, etc.

The vessel in which dissolution is effected should have at least its inner surface composed of a material which is resistant to attack by the molten mass; or, if slightly attacked, does not evolve products which would adversely affect the dissolution of the carbide in the molten halide or adversely affect the properties of the molten solution containing the dissolved carbide. Examples of materials that are satisfactory for forming the vessel (or inner liner thereof) in which the dissolution is effected are the various stainless steels. Construction materials for the vessel obviously should be chosen among those that do not melt below the temperature at which the carbide is dissolved in the molten halide.

The dissolution of the carbide in the molten halide is an equilibrium process. Hence, in some cases the approach to equilibrium conditions can be accelerated by incorporating a suitable additive that will effect this result.

The additive may be a fluxing agent. Sodium and potassium halides, for instance the chlorides, are examples of additives which act as a flux and lower the temperature at which dissolution of the carbide in the molten halide takes place. (Parenthetically it might here be mentioned that sodium and potassium halides, specifically the chlorides, are non-operative as solvents for calcium carbide; that is, calcium carbide will not dissolve in the aforementioned halides, in molten state, in any measurable amount.)

The additive also can be a material such as a catalyst for promoting or accelerating the reaction between the dissolved carbide and a reactive compound subsequently to be reacted with the carbide; or it can be a stabilizer for the solution; or an antioxidant or oxygen scavenger; or an inhibitor of any sort of action that would or might detrimentally affect the solution; or a scavenger of water. The amount of such additive may be varied as desired or as conditions may require. For example, the additive may be a minor mole percent (less than 50 mole percent, e.g., from 0.0001% to 49.9 mole percent) of the total molar amount of additive plus solvent halide. Thus the additive, e.g., a catalyst, antioxidant, inhibitor, stabilizer, scavenger, etc., may comprise from 0.001% to 4 or 5% by weight of the carbide dissolved in the molten halide.

It has been indicated hereinbefore that the lithium halide and/or alkaline-earth metal halide should be substantially completely anhydrous. By "substantially completely anhydrous" or "anhydrous" alone, as used herein and in the appended claims with reference to the metallic halide, is meant a halide of the kind specified that contains no more than a trace of water. Higher percentages may be present in the starting halide, but nearly all, if not all, of this water in free or combined state will be driven off from the halide prior to the addition of the carbide thereto. Hence the molten halide, which is the solvent for the carbide, is and should be substantially completely anhydrous, that is, substantially free of water. This is because water reacts with calcium and other carbides of the kind used in practicing the present invention.

The compositions of this invention are unique and useful in that they permit the separation of an alkali-metal carbide and/or an alkaline-earth metal carbide from its surface layer of oxide which is normally present and which, as has been mentioned hereinbefore, is a deterrent to the reactivity of the carbide. Consequently our invention makes it possible to carry out reactions on the oxide-free surface of the aforementioned carbides or in homogeneous solution; in the latter case the carbide is substantially uniformly dissolved in the molten halide.

In order that those skilled in the art may better understand how the present invention can be carried into effect, the following examples are given by way of illustration and not by way of limitation. All parts and percentages are by weight unless otherwise indicated.

*Example 1*

Approximately 1 part by weight of ¼" lumps of commercial calcium carbide and approximately 3 parts by weight of anhydrous lithium chloride are placed in a vertical, stainless steel tube supported by a coarse-porosity, stainless steel disc welded into the tube. Suitable attachments are used to exclude air and to keep a rapid stream of dry, inert gas (e.g., argon, helium, etc.) passing up through the tube. The tube and contents are then heated electrically to 820° C. (as measured by a Chromel-Alumel thermocouple) and held at this temperature for 2 to 3 hours. The stream of dry, inert gas, specifically argon, is passed through at sufficient pressure to keep the molten solution above the porous metal disc. At the end of this time, the molten solution is discharged by releasing the pressure and then applying downward pressure of argon to the top of the tube to force the liquid through. The molten solution falls through a drip cone to a cool receiver where it solidifies to a gray solid which contains calcium carbide. Analysis of this material by precipitation of cuprous acetylide with ammoniacal $Cu^+$ solution gives approximately 17 weight percent calcium carbide. The presence of this carbide lowers the melting point of the solvent lithium chloride which is evidence for a true solution, as is the visual homogeneity of the frozen melt and the consistency of analytical results from several portions of the product. The product shows much sarper lines for $CaC_2$ in its X-ray powder pattern than the starting carbide product, indicating an increase of crystallinity. There is no evidence of formation of lithium metal.

*Example 2*

Same as Example 1, except that the temperature of the mixture is held at 700° C. for 3 hours and the resulting solution contains by analysis approximately 11 weight percent calcium carbide.

*Example 3*

Same as Example 1, except that the temperature of the mixture is held at 900 °C. for 3 hours and the resulting solution contains by analysis approximately 21 weight percent calcium carbide.

*Example 4*

Same as Example 1, except that approximately 1 part by weight of commercial calcium carbide is mixed with 4 parts by weight of anhydrous calcium chloride and the mixture is held at 820° C. for 3 hours. The resulting solution contains approximately 5.7 weight percent calcium carbide.

*Example 5*

Same as Example 1, except that approximately 1 part by weight of commercial calcium carbide is mixed with 4 parts by weight of anhydrous lithium bromide and the mixture is held at 820° C. for 3 hours. A Nichrome screen is used here to cover the carbide lumps and keep them below the surface of the denser, molten bromide. The resulting solution contains approximately 6 weight percent calcium carbide.

*Example 6*

Same as Example 1, except that approximately one part by weight of ¼" lumps of lithium carbide ($Li_2C_2$) and 4 parts by weight of anhydrous lithium chloride are used and the mixture is held at 820° C. for 3 hours. The resulting solution contains approximately 20 weight percent lithium carbide.

*Example 7*

Same as Example 1, except that approximately 1 part commercial calcium carbide is used with 15 parts of an anhydrous mixture of lithium chloride and potassium chloride containing 70 mole percent lithium chloride and 30 mole percent potassium chloride. This mixture of calcium carbide and salt is held at about 570° C. for 30 minutes, and the resulting solution contains about 1.0 weight percent calcium carbide.

The advantage of using an additive such as KCl is that it reduces the temperature at which dissolution can be effected.

*Example 8*

Same as Example 1, except that approximately 1 part commercial calcium carbide and 4 parts anhydrous barium chloride are held at 1000° C. for 2½ hours and the resulting solution contains approximately 4.5 weight percent calcium carbide.

*Example 9*

Same as Example 1, except that approximately 1 part commercial calcium carbide and 1 part anhydrous lithium fluoride are held at 920° C. for 3 hours, and the resulting solution contains approximately 43 weight percent calcium carbide.

*Example 10*

Same as Example 1, except that approximately 1 part commercial calcium carbide is used with 2 parts of an anhydrous eutectic mixture of lithium chloride and lithium fluoride containing 70 mole percent lithium chloride and 30 mole percent lithium fluoride. This mixture of calcium carbide and said salts is heated to 820° C. for 1 hour and then held at 550° C. for 2 hours. The resulting solution contains approximately 11 weight percent calcium carbide.

The following example illustrates one use of the compositions of this invention.

*Example 11*

Approximately 20 parts of a molten solution of calcium carbide in lithium chloride containing approximately 15 percent of dissolved calcium carbide is held at 820° C., and 13 parts of anhydrous lead chloride is added to it. An exothermic reaction takes place, and from the reaction mixture approximately 5 parts of lead metal is obtained. This yield corresponds to about 50% of the theoretical.

We claim:

1. A composition which is a solution of a carbide of the class consisting of the carbides of the alkali metals and the carbides of the alkaline-earth metals calcium, strontium and barium, said carbide being dissolved in a molten solvent which is non-reactive with the said carbide during and after dissolution thereof and which consists essentially of at least one member of the class consisting of the anhydrous, molten lithium halides and the anhydrous, molten halides of the aforesaid alkaline-earth metals, the amount of dissolved carbide per 100 parts by weight of the resulting solution being from about 1% to about 50% of the solution.

2. A composition which is a solution of calcium carbide dissolved in a molten solvent which is non-reactive with the said carbide during and after dissolution thereof and which consists essentially of anhydrous molten lithium chloride, the amount of dissolved carbide per 100 parts by weight of the resulting solution being from about 1% to about 50% by weight of the solution.

3. An anhydrous solution consisting essentially of a molten mass of calcium carbide, potassium chloride and lithium chloride, said potassium chloride lowering the temperature at which the said carbide will dissolve in the said lithium chloride, the amount of dissolved carbide in the aforesaid solution per 100 parts by weight of the total amount of calcium carbide and lithium chloride being from about 1% to about 50% by weight thereof, and the potassium chloride constituting from 0.0001 mole percent to 49.9 mole percent of the total molar amount of potassium chloride plus lithium chloride.

4. A composition which is a solution of calcium carbide dissolved in a molten solvent which is non-reactive with the said carbide during and after dissolution thereof and which consists essentially of anhydrous molten calcium chloride, the amount of dissolved carbide per 100 parts by weight of the resulting solution being from about 1% to about 50% by weight of the solution.

5. A composition which is a solution of calcium carbide dissolved in a molten solvent which is non-reactive with the said carbide during and after dissolution thereof and which consists essentially of anhydrous molten barium chloride, the amount of dissolved carbide per 100 parts by weight of the resulting solution being from about 1% to about 50% by weight of the solution.

6. A composition which is a solution of calcium carbide dissolved in a molten solvent which is non-reactive with the said carbide during and after dissolution thereof and which consists essentially of anhydrous molten lithium fluoride, the amount of dissolved carbide per 100 parts by weight of the resulting solution being from about 1% to about 50% by weight of the solution.

References Cited in the file of this patent

UNITED STATES PATENTS

| | | |
|---|---|---|
| 1,704,257 | Marden et al. | Mar. 5, 1929 |
| 2,729,689 | Blanchard | Jan. 3, 1956 |
| 2,813,017 | Mathieu | Nov. 12, 1957 |
| 2,814,561 | De Wet Erasmus | Nov. 26, 1957 |

OTHER REFERENCES

Carter: "Magnesium Carbide and Methylacetylene," FIAT Final Report No. 1019, January 17, 1947, Office of Military Gov. for Germany (U.S.). Field Information Agency Technical, 5 pages, Technical Industrial Intelligence Div., U.S. Dept. of Comm.